(12) United States Patent
Sakata

(10) Patent No.: US 11,815,796 B2
(45) Date of Patent: Nov. 14, 2023

(54) LIGHT SOURCE APPARATUS AND PROJECTOR

(71) Applicant: SEIKO EPSON CORPORATION, Tokyo (JP)

(72) Inventor: Hidefumi Sakata, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/706,679

(22) Filed: Mar. 29, 2022

(65) Prior Publication Data

US 2022/0308432 A1 Sep. 29, 2022

(30) Foreign Application Priority Data

Mar. 29, 2021 (JP) ................. 2021-055157

(51) Int. Cl.
*G03B 21/20* (2006.01)
*G03B 33/12* (2006.01)
*G02B 26/00* (2006.01)
*H04N 9/31* (2006.01)

(52) U.S. Cl.
CPC ......... *G03B 21/204* (2013.01); *G02B 26/008* (2013.01); *G03B 21/208* (2013.01); *G03B 21/2013* (2013.01); *G03B 21/2066* (2013.01); *G03B 33/12* (2013.01); *H04N 9/3161* (2013.01); *H04N 9/3164* (2013.01)

(58) Field of Classification Search
CPC ............. G03B 21/204; G03B 21/2013; G03B 21/208; H04N 9/3161; H04N 9/3164; G02B 26/008
USPC .......................................... 353/31
See application file for complete search history.

(56) References Cited

U.S. PATENT DOCUMENTS

| 11,320,728 | B2* | 5/2022 | Pettitt | ............... G03B 21/204 |
|---|---|---|---|---|
| 2013/0222772 | A1 | 8/2013 | Matsubara | |
| 2013/0329448 | A1 | 12/2013 | Franz et al. | |
| 2017/0075203 | A1* | 3/2017 | Cheng | ............... H04N 9/3158 |
| 2018/0239230 | A1 | 8/2018 | Pettitt et al. | |
| 2020/0201155 | A1 | 6/2020 | Akiyama | |

FOREIGN PATENT DOCUMENTS

| JP | 2014-507055 A | 3/2014 |
|---|---|---|
| JP | 2020-101711 A | 7/2020 |
| WO | WO2012-066654 A | 5/2012 |

* cited by examiner

*Primary Examiner* — Jerry L Brooks
(74) *Attorney, Agent, or Firm* — Dority & Manning, P.A.

(57) ABSTRACT

A light source apparatus includes a first light source that outputs first excitation light having a first wavelength band, a second light source that outputs second excitation light having a second wavelength band, a third light source that outputs third light having a third wavelength band, a wavelength converter that has a first surface and a second surface and converts the first excitation light and the second excitation light in term of wavelength and emits fourth light having a fourth wavelength band, and a light combiner that combines the third light outputted from the third light source with the fourth light emitted from the wavelength converter to generate illumination light. The first excitation light outputted from the first light source is incident on the first surface of the wavelength converter via the light combiner, and the second excitation light outputted from the second light source is incident on the second surface of the wavelength converter.

19 Claims, 4 Drawing Sheets

LIGHT SOURCE APPARATUS AND PROJECTOR

The present application is based on, and claims priority from JP Application Serial Number 2021-055157, filed Mar. 29, 2021, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a known light source apparatus that generates white illumination light by combining fluorescence emitted from a phosphor and blue light outputted from a solid-state light source. For example, JP-T-2014-507055 discloses a light source apparatus including an excitation light source that outputs excitation light, a phosphor element that converts the excitation light into yellow light, a solid-state light source that outputs blue light, and a dichroic mirror that guides the excitation light to the phosphor element and mixes the yellow light and the blue light with each other.

In the light source apparatus disclosed in JP-T-2014-507055, the intensity of the fluorescence generated by the phosphor is lower than the intensity of the blue light outputted from the solid-state light source. Therefore, for example, to generate illumination light having a desired white balance, the intensity of blue light is suppressed to a small value that matches the intensity of the fluorescence, resulting in a problem of a decrease in the luminance of the illumination light. Furthermore, when a light emitting diode (LED) is used as the excitation light source, the luminance per unit area of the LED is small, resulting in a difficulty increasing the luminance of the illumination light.

SUMMARY

To solve the problems described above, a light source apparatus according to an aspect of the present disclosure includes a first light source that outputs first excitation light having a first wavelength band, a second light source that outputs second excitation light having a second wavelength band, a third light source that outputs third light having a third wavelength band, a wavelength converter that has a first surface and a second surface opposite from the first surface and converts the first excitation light and the second excitation light in term of wavelength and emits fourth light having a fourth wavelength band different from the first, second, and third wavelength bands, and a light combiner that combines the third light outputted from the third light source with the fourth light emitted from the wavelength converter to generate illumination light. The first excitation light outputted from the first light source is incident on the first surface of the wavelength converter via the light combiner, and the second excitation light outputted from the second light source is incident on the second surface of the wavelength converter.

A projector according to another aspect of the present disclosure includes the light source apparatus according to the aspect of the present disclosure, a light modulator that modulates light outputted from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 4.

A projector according to the present embodiment is an example of a projector using liquid crystal panels as light modulators.

Figure 1:
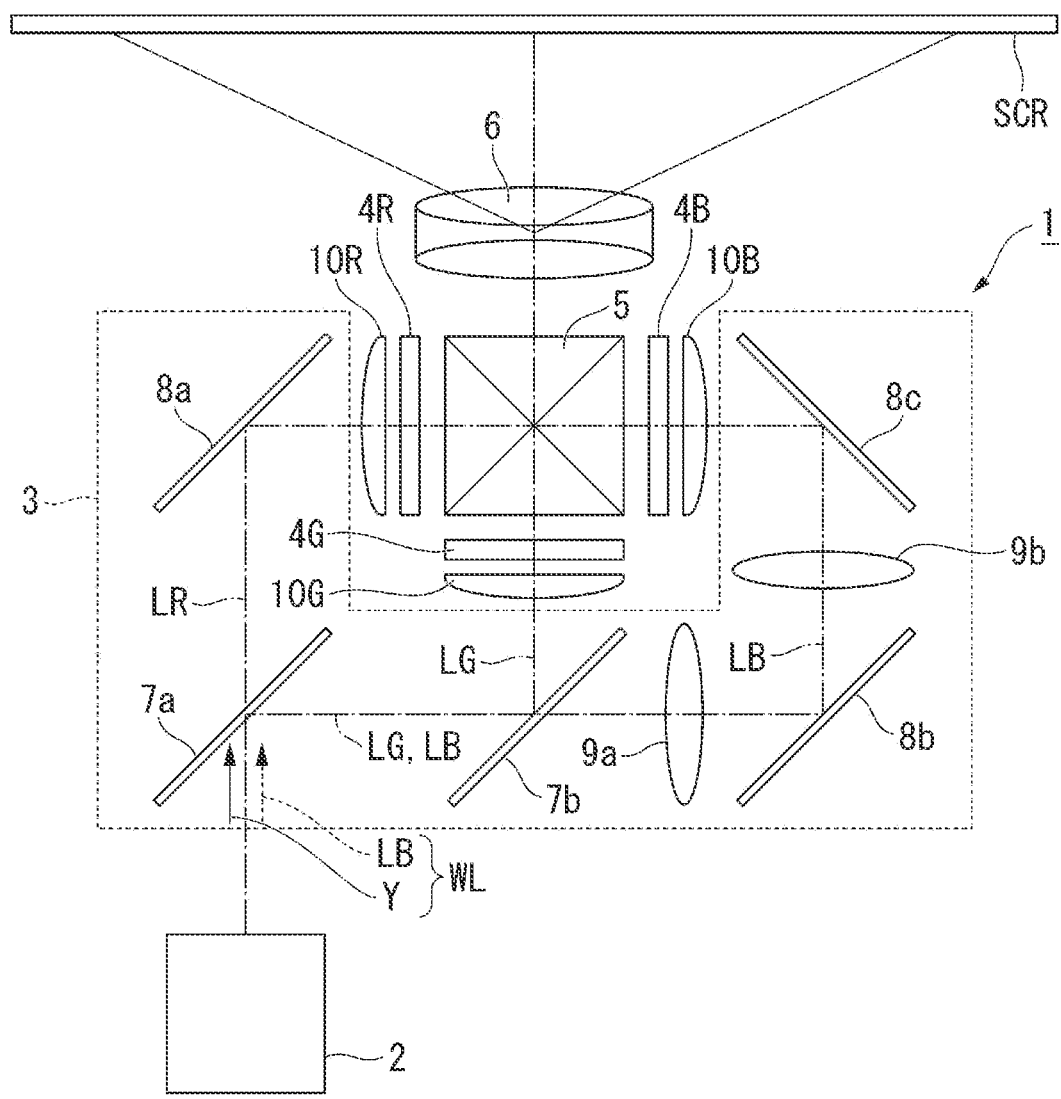
FIG. 1 is a schematic configuration diagram of a projector according to a first embodiment.

FIG. 1 shows a schematic configuration of a projector 1 according to the present embodiment.

In the following drawings, components are drawn at different dimensional scales in some cases for clarification of each of the components.

The projector 1 according to the present embodiment is a projection-type image display apparatus that displays a color image on a screen (projection receiving surface) SCR, as shown in FIG. 1. The projector 1 includes three light modulators corresponding to three types of color light, namely red light LR, green light LG, and blue light LB.

The projector 1 includes a light source apparatus 2, a color separation system 3, light modulators 4R, 4G, and 4B, a light combining system 5, and a projection optical apparatus 6.

The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates white illumination light LW outputted from the light source apparatus 2 into the red light LR and light containing the green light LG and the blue light LB. Specifically, the first dichroic mirror 7a transmits the red light LR and reflects the light containing the green light LG and the blue light LB. The second dichroic mirror 7b reflects the green light LG and transmits the blue light LB to separate the light containing the green light LG and the blue light LB into the green light LG and the blue light LB.

The first reflection mirror 8a is disposed in the optical path of the red light LR and reflects the red light LR having passed through the first dichroic mirror 7a toward the light modulator 4R. The second reflection mirror 8b and the third reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a is disposed in the optical path of the blue light LB between the second dichroic mirror 7b and the second reflection mirror 8b. The second relay lens 9b is disposed in the optical path of the blue light LB between the second reflection mirror 8b and the third reflection mirror 8c.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident side and the light exiting side of each of the liquid crystal panels and transmits only linearly polarized light polarized in a specific direction.

A field lens 10R is disposed on the light incident side of the light modulator 4R. The field lens 10R parallelizes the chief ray of the red light LR to be incident on the light modulator 4R. A field lens 10G is disposed on the light incident side of the light modulator 4G. The field lens 10G parallelizes the chief ray of the green light LG to be incident on the light modulator 4G. A field lens 10B is disposed on the light incident side of the light modulator 4B. The field lens 10B parallelizes the chief ray of the blue light LB to be incident on the light modulator 4B.

The light combining system 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combining system 5 is formed, for example, out of a cross dichroic prism.

The projection optical apparatus 6 is formed out of a plurality of projection lenses. The projection optical apparatus 6 enlarges the image light combined by the light combining system 5 and projects the enlarged image light toward the screen SCR. An image is thus displayed on the screen SCR.

The configuration of the light source apparatus 2 will be described below.

Figure 2:
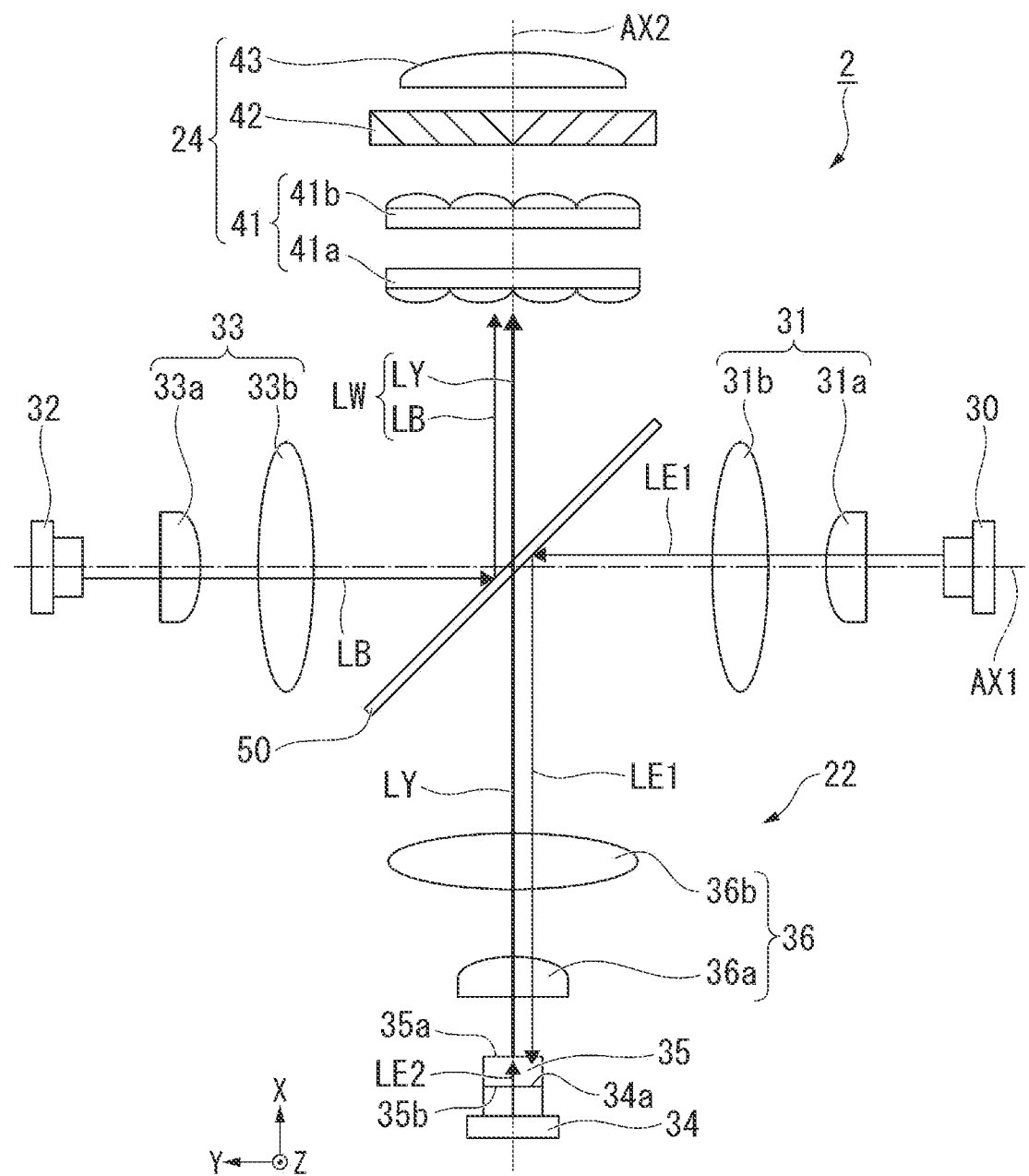
FIG. 2 is a schematic configuration diagram of a light source apparatus according to the first embodiment.

FIG. 2 shows a schematic configuration of the light source apparatus 2.

The light source apparatus 2 includes a first light source 30, a first collimator optical system 31, a wavelength converter 35, a second light source 34, a second collimator optical system 36, a third light source 32, a third collimator optical system 33, a light combiner 50, and a uniform illumination system 24, as shown in FIG. 2.

In the present embodiment, the axis along the chief ray of first excitation light LE1 outputted from the first light source 30 is referred to as a first optical axis AX1. The axis along the chief ray of fluorescence LY emitted from the wavelength converter 35 is referred to as a second optical axis AX2. The first light source 30, the first collimator optical system 31, the light combiner 50, the third collimator optical system 33, and the third light source 32 are arranged along the first optical axis AX1. The second light source 34, the second collimator optical system 36, the light combiner 50, and the uniform illumination system 24 are arranged along the second optical axis AX2.

The first light source 30 is formed, for example, out of an LED device. The first light source 30 includes at least one LED device and outputs the first excitation light LE1 having a first wavelength band. The number of LED devices that form the first light source 30 is not limited to a specific number. The first excitation light LE1 has, for example, a blue wavelength band ranging from 400 to 480 nm and has a peak wavelength of, for example, 440 nm. The first excitation light LE1, which is outputted from the first light source 30, is incident on a first surface 35a of the wavelength converter 35 via the light combiner 50, as will be described later. The first light source 30 may be formed out of a laser device in place of the LED device.

The first collimator optical system 31 is provided in the optical path of the first excitation light LE1 between the first light source 30 and the light combiner 50. The first collimator optical system 31 is formed out of a first lens 31a and a second lens 31b. The number of lenses that form the first collimator optical system 31 is not limited to a specific number. The first excitation light LE1 outputted from the first light source 30 enters the first collimator optical system 31, which then substantially parallelizes the first excitation light LE1.

The wavelength converter 35 includes at least a phosphor and has the first surface 35a and a second surface 35b opposite from the first surface 35a. The first surface 35a is the surface on which the first excitation light LE1 is incident, via which the fluorescence LY exits, and which faces the light combiner 50. The second surface 35b is the surface on which second excitation light LE2, which will be described later, is incident and faces the second light source 34. The wavelength converter 35 converts the first excitation light LE1 and the second excitation light LE2 in terms of wavelength and outputs the fluorescence LY having a fourth wavelength band different from the first wavelength band of the first excitation light LE1, a second wavelength band of the second excitation light LE2, and a third wavelength band of the blue light LB from the third light source 32.

The fluorescence LY in the present embodiment corresponds to the fourth light in the claims.

The wavelength converter 35 contains a ceramic polycrystalline phosphor that converts the first excitation light LE1 and the second excitation light LE2 in terms of wavelength into the fluorescence LY. The fourth wavelength band of the fluorescence LY is, for example, a yellow wavelength band ranging from 490 to 750 nm. That is, the fluorescence LY is yellow fluorescence containing a red light component and a green light component. The wavelength converter 35 may contain a single crystal phosphor in place of a polycrystalline phosphor. The wavelength converter 35 may instead be made of fluorescent glass. Still instead, the wavelength converter 35 may be formed out of a binder which is made, for example, of glass or resin and in which a large number of phosphor particles are dispersed. The wavelength converter 35 made of a material of this type converts the first excitation light LE1 and the second excitation light LE2 into the fluorescence LY.

Specifically, the material of the wavelength converter 35 contains, for example, an yttrium-aluminum-garnet-based (YAG-based) phosphor. Consider YAG:Ce, which contains cerium (Ce) as an activator, by way of example, and the wavelength converter 35 can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The second light source 34 is provided so as to face the second surface 35b of the wavelength converter 35. The second light source 34 is formed, for example, out of an LED device. The second light source 34 includes at least one LED device and outputs the second excitation light LE2 having the second wavelength band. The number of LED devices that form the second light source 34 is not limited to a specific number. The second excitation light LE2 has, for example, a blue wavelength region ranging from 400 to 480 nm and has a peak wavelength of, for example, 440 nm. The second excitation light LE2 outputted from the second light source 34 is incident on the second surface 35b of the wavelength converter 35, as will be described later. The LED device that forms the second light source 34 may be the same as or different from the LED device that forms the first light source 30. That is, the second wavelength band may be the same as or different from the first wavelength band. The second light source 34 may be formed out of a laser device in place of the LED device.

In the present embodiment, the second light source 34 is directly bonded to the second surface 35b of the wavelength converter 35. That is, a light exiting surface 34a of the second light source 34 and the second surface 35b of the wavelength converter 35 are in contact with each other.

Instead, a light transmissive member made, for example, of silicone resin may be provided between the second light source 34 and the wavelength converter 35. In this case, the light exiting surface 34a of the second light source 34 and the second surface 35b of the wavelength converter 35 are desirably in contact with each other via the light transmissive member. In both the configurations, it is desirable that there is no gap between the light exiting surface 34a of the second light source 34 and the second surface 35b of the wavelength converter 35 so that there is no air layer therebetween.

The second collimator optical system 36 is provided in the optical path of the fluorescence LY and the first excitation light LE1 between the wavelength converter 35 and the light combiner 50. The second collimator optical system 36 is formed out of a first lens 36a and a second lens 36b. The number of lenses that form the second collimator optical system 36 is not limited to a specific number. The fluorescence LY emitted from the wavelength converter 35 enters the second collimator optical system 36, which then substantially parallelizes the fluorescence LY. Furthermore, the first excitation light LE1 outputted from the first light source 30 and passing through the optical combiner 50 enters the second collimator optical system 36, which focuses the first excitation light LE1 and causes the focused first excitation light LE1 to be incident on the wavelength converter 35.

The periphery of at least one of the first lens 36a and the second lens 36b, which form the second collimator optical system 36, may be provided with a selective reflection layer that selectively reflects the fluorescence LY. In this case, the selective reflection layer is formed in an annular shape with a central opening through which the first excitation light LE1 and the fluorescence LY pass.

The third light source 32 is provided in the first optical axis AX1 so as to face the light combiner 50. The third light source 32 is formed, for example, out of a laser device. The third light source 32 includes at least one laser device and outputs the blue light LB having the third wavelength band. The number of laser devices that form the third light source 32 is not limited to a specific number. The blue light LB has, for example, a blue wavelength region ranging from 440 to 480 nm and has a peak wavelength of, for example, 460 nm. The third wavelength band may be the same as the first and second wavelength bands, but it is desirable that the third wavelength band is formed of wavelengths longer than those in the first and second wavelength bands, as in the present embodiment. Instead, the first and second wavelength bands may differ from each other and the third wavelength band may be the same as the second wavelength band, or the first, second, and third wavelength bands may differ from one another. The third light source 32 may be formed out of an LED device in place of the laser device.

The blue light LB in the present embodiment corresponds to the third light in the claims.

Although not shown, the light source apparatus 2 according to the present embodiment includes a controller that controls the outputs from the first light source 30, the second light source 34, and the third light source 32. The controller controls the outputs from the light sources 30, 34, and 32 independently to one another by controlling the electric power supplied to the first light source 30, the second light source 34, and the third light source 32.

The light combiner 50 is provided at the intersection of the first optical axis AX1 and the second optical axis AX2 so as to incline by an angle of 45° with respect to each of the first optical axis AX1 and the second optical axis AX2. The light combiner 50 is formed out of a dichroic mirror that reflects light having the blue wavelength band and transmits light having the yellow wavelength band. The light combiner 50 therefore reflects the first excitation light LE1 outputted from the first light source 30 and combines the blue light LB outputted from the third light source 32 with the fluorescence LY emitted from the wavelength converter 35 to generate the illumination light LW.

In the light source apparatus 2 having the configuration described above, the first excitation light LE1 outputted from the first light source 30 is substantially parallelized by the first collimator optical system 31, reflected off the light combiner 50, focused by the second collimator optical system 36, and incident on the first surface 35a of the wavelength converter 35. On the other hand, the second excitation light LE2 outputted from the second light source 34 is incident on the second surface 35b of the wavelength converter 35.

The first excitation light LE1 and the second excitation light LE2 having entered the wavelength converter are converted in terms of wavelength into the fluorescence LY, which exits via the first surface 35a of the wavelength converter 35. In this process, the fluorescence LY, which is isotropically emitted in the wavelength converter 35, exits not only via the first surface 35a but via the second surface 35b. However, the fluorescence LY that exits via the second surface 35b is reflected off a reflection layer of the LED device that forms the second light source 34 and therefore eventually exits via the first surface 35a of the wavelength converter 35.

The blue light LB outputted from the third light source 32 is substantially parallelized by the third collimator optical system 33, reflected off the light combiner 50, and travels toward the uniform illumination system 24. The fluorescence LY that exits via the first surface 35a of the wavelength converter 35 is substantially parallelized by the second collimator optical system 36, passes through the light combiner 50, and travels toward the uniform illumination system 24. The blue light LB and the fluorescence LY are thus combined with each other by the light combiner 50 to form the white illumination light LW, which enters the uniform illumination system 24.

The uniform illumination system 24 includes an optical integration system 41, a polarization converter 42, and a superimposing lens 43.

The optical integration system 41 is formed out of a first lens array 41a and a second lens array 41b. The first lens array 41a and the second lens array 41b each include a plurality of lenses arranged in an array.

The illumination light LW having passed through the optical integration system 41 enters the polarization converter 42. The polarization converter 42 converts the polarization direction of the light having exited out of the optical integration system 41. Specifically, the polarization converter 42 converts a plurality of sub-luminous fluxes into which the first lens array 41a divides the illumination light LW and which exit out of the second lens array 41b into linearly polarized luminous fluxes. The polarization converter 42 includes a polarization separation layers that transmit one of linearly polarized light components contained in the illumination light LW and reflects another one of the linearly polarized light components in a direction perpendicular to the optical axis, reflection layers that reflect the other linearly polarized light reflected off the polarization separation layers in the direction parallel to the optical axis, and retardation films that convert the other linearly polarized light component reflected off the reflection layers into the one linearly polarized light component.

The illumination light LW having passed through the polarization converter 42 enters the superimposing lens 43. The superimposing lens 43, in cooperation with the second lens array 41b of the optical integration system 41, superimposes the plurality of sub-luminous fluxes on one another in an image formation region of each of the light modulators 4R, 4G, and 4B. The uniform illumination system thus homogenizes the illuminance distribution of the illumination light LW in the image forming region of each of the light modulators 4R, 4G, and 4B. The light source apparatus 2 according to the present embodiment thus outputs the illumination light LW.

The present inventor has examined a suitable configuration of one of the collimator optical systems. The content of the examination will be descried below.

In the light source apparatus 2 having the configuration described above, the fluorescence LY emitted from the wavelength converter 35 and the first excitation light LE1 outputted from the first light source 30 enter the second collimator optical system 36. For example, in the case of a light source apparatus used in a projector, the optical system of the projector is typically designed so as to be optimal for light having a green wavelength band, which greatly affects the display quality. Therefore, in consideration of the need for the state in which the characteristics of the optical system of the light source apparatus matches the characteristics of the optical system of the projector, designing the second collimator optical system 36 so as to be optimal for light having the yellow wavelength band is more preferable than for light having the blue wavelength band.

However, when the second collimator optical system 36 is designed so as to be optimal for light having the yellow wavelength band, the second collimator optical system 36 performs the desired function for the fluorescence LY emitted from the wavelength converter 35 but may not do for the first excitation light LE1 outputted from the first light source 30.

Specifically, when the second collimator optical system 36 is optimized for light having the yellow wavelength band, the position where the first excitation light LE1 is focused shifts due to the effect of chromatic aberrations produced by the lenses of the second collimator optical system 36 because the fluorescence LY and the first excitation light LE1 differ in the wavelength band from each other. For example, when the wavelength of the fluorescence LY is 550 nm and the wavelength of the first excitation light LE1 is 430 nm, the position where the first excitation light LE1 is focused shifts about 120 μm from the position where the second collimator optical system 36 focuses the fluorescence LY to a position closer to the second collimator optical system 36.

In this case, the first excitation light LE1 is not focused on the wavelength converter 35 but is focused at a position closer to the second collimator optical system 36, so that the first excitation light LE1 spreads out on the wavelength converter 35. Therefore, when the area of the light exiting surface of the first light source 30 is equal to the area of the light incident surface of the wavelength converter 35, the region irradiated with the first excitation light LE1 extends off the wavelength converter 35, resulting in loss of the first excitation light LE1.

As a first measure to solve the problem described above, the focal length of the first collimator optical system 31 and the focal length of the second collimator optical system 36 are so made different from each other that the focal length of the first collimator optical system 31 is longer than that of the second collimator optical system 36. The image forming magnification of the first collimator optical system 31 is thus made smaller than before the focal length of the first collimator optical system 31 is changed, so that the region irradiated with the first excitation light LE1 on the wavelength converter 35 decreases. As a result, the loss of the first excitation light LE1 can be suppressed, whereby the efficiency at which the first excitation light LE1 is used can be increased.

Figure 3:
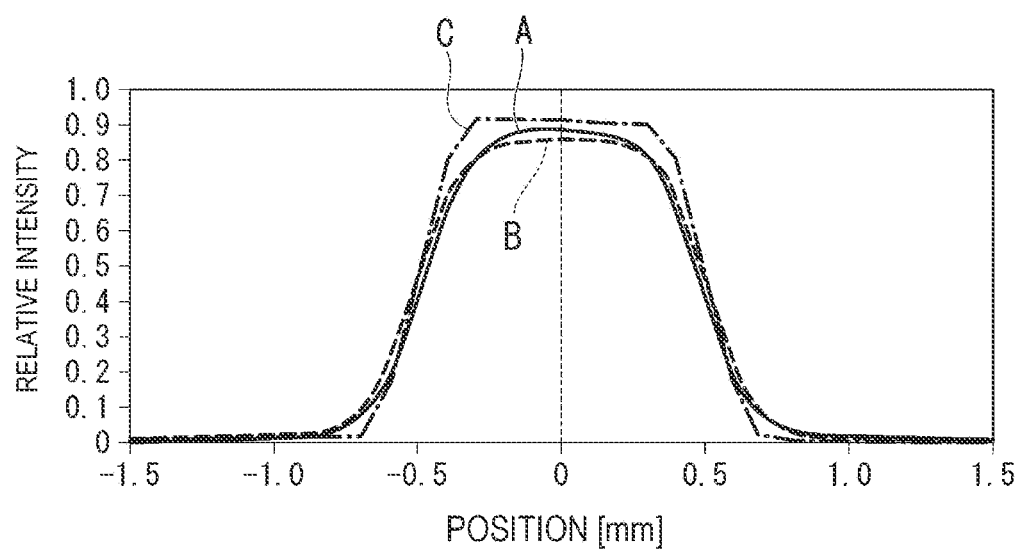
FIG. 3 shows a relative intensity distribution on a wavelength converter when the focal length of a first collimator optical system is longer than the focal length of a second collimator optical system.

FIG. 3 shows the relative intensity distribution on the wavelength converter 35 when the focal length of the first collimator optical system 31 is longer than the focal length of the second collimator optical system 36 and specifically shows the cross-sectional profile of the distribution, which is a result of a simulation conducted by the present inventor.

In FIG. 3, the horizontal axis represents the position (mm) with respect to the center of the wavelength converter 35, and the vertical axis represents the relative intensity.

The solid-line graph A shows the relative intensity distribution for light having the wavelength of 430 nm (blue light) when the focal length of the first collimator optical system 31 is longer than that of the second collimator optical system 36. The broken-line graph B shows the relative intensity distribution for light having the wavelength of 430 nm (blue light) when the focal length of the first collimator optical system 31 is equal to that of the second collimator optical system 36. The dashed-line graph C shows the relative intensity distribution for light having the wavelength of 550 nm (yellow light) under the same condition for the graph B.

In Comparison Example, since the second collimator optical system 36 is optimized for light having the wavelength of 550 nm (yellow light), the relative intensity distribution for the blue light (graph B) as compared with the relative intensity distribution for the yellow light (graph C) shows that the maximum relative intensity decreases, and that the skirt of the graph beyond ±0.5 mm widens so that the irradiated region also widens.

In contrast, the relative intensity distribution, when the focal length of the first collimator optical system 31 is longer than that of the second collimator optical system 36 (graph A), as in this embodiment, as compared with the graph B in Comparison Example shows that the maximum relative intensity increases and the skirt of the graph narrows so that the irradiated region narrows.

The simulation thus demonstrates that the loss of the first excitation light LE1 can be reduced by making the focal length of the first collimator optical system 31 longer than that of the second collimator optical system 36.

Furthermore, the area of the first light source 30 viewed in the direction along the first optical axis AX1 may be greater than the area of the wavelength converter 35 viewed in the direction along the second optical axis AX2. Making the focal length of the first collimator optical system 31 longer than that of the second collimator optical system 36 causes a change in the image forming magnification of the first collimator optical system 31, so that the first collimator optical system 31 serves as a reduction optical system. A larger first light source 30 can therefore be used. In this case, the region irradiated with the first excitation light LE1 is larger than when a larger first light source 30 is not used, but the amount of excitation light with which the wavelength converter 35 is irradiated increases, whereby the amount of fluorescence emitted from the wavelength converter 35 can be increased.

Next, as a second measure to solve the problem described above, the position of the first light source 30 on the first optical axis AX1 is shifted from the position where the first collimator optical system 31 focuses light having the yellow wavelength band to a position closer to the first collimator optical system 31. The region irradiated with the first excitation light LE1 on the wavelength converter 35 thus decreases as compared with the case where the first light source 30 is disposed in a position where the first collimator optical system 31 focuses light having the yellow wavelength band. As a result, the loss of the first excitation light LE1 can be suppressed, whereby the efficiency at which the first excitation light LE1 is used can be increased. In this case, since the positional relationship between the wavelength converter 35 and the second collimator optical system 36 does not change, there is no particular obstacle to the function of parallelizing the fluorescence LY.

Figure 4:
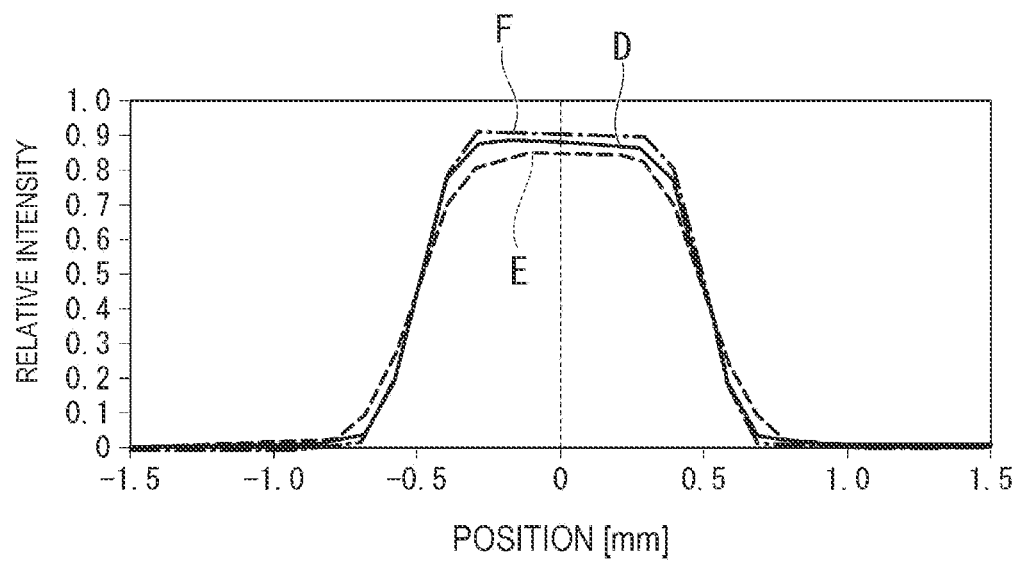
FIG. 4 shows the relative intensity distribution on the wavelength converter when the position of a first light source is shifted from the focal position of the first collimator optical system.

FIG. 4 shows the relative intensity distribution on the wavelength converter 35 when the position of the first light source 30 is shifted from the focal position of the first collimator optical system 31 and specifically shows the cross-sectional profile of the distribution, which is another result of the simulation conducted by the present inventor.

In FIG. 4, the horizontal axis represents the position (mm) with respect to the center of the wavelength converter 35, and the vertical axis represents the relative intensity.

The solid-line graph D shows the relative intensity distribution for light having the wavelength of 430 nm (blue light) when the position of the first light source 30 is shifted from the focal position of the first collimator optical system 31 toward the first collimator optical system 31. The broken-line graph E shows the relative intensity distribution for light having the wavelength of 430 nm (blue light) when the position of the first light source 30 coincides with the focal position of the first collimator optical system 31. The dashed-line graph F shows the relative intensity distribution for light having the wavelength of 550 nm (yellow light) under the same condition for the graph E.

In Comparison Example, since the second collimator optical system 36 is optimized for light having the wavelength of 550 nm (yellow light), the relative intensity distribution for the blue light (graph E) as compared with the relative intensity distribution for the yellow light (graph F) shows that the maximum relative intensity decreases, and that the skirt of the intensity distribution curve widens so that the irradiated region also widens, as in FIG. 3.

In contrast, the relative intensity distribution (graph D) when the position of the first light source 30 is shifted from the focal position of the first collimator optical system 31 toward the first collimator optical system 31, as in this embodiment, as compared with the graph B in Comparison Example shows that the maximum relative intensity increases, and that the skirt of the intensity distribution curve narrows so that the irradiated region narrows.

As escribed above, the simulation demonstrates that the loss of the first excitation light LE1 can be reduced by shifting the position of the first light source 30 from the focal position of the first collimator optical system 31 toward the first collimator optical system 31.

Also when the second measure is employed, the area of the first light source 30 viewed in the direction along the first optical axis AX1 may be greater than the area of the wavelength converter 35 viewed in the direction along the second optical axis AX2, as in the case where the first measure is employed. The amount of fluorescence emitted from the wavelength converter 35 can thus be increased.

The first and second measures described above may be employed in combination. The efficiency at which the wavelength converter 35 is irradiated with the first excitation light LE1 can thus be further increased.

Effects of First Embodiment

The light source apparatus 2 according to the present embodiment includes the first light source 30, which outputs the first excitation light LE1, the second light source 34, which outputs the second excitation light LE2, the third light source 32, which outputs the blue light LB, the wavelength converter 35, which has the first surface 35a and the second surface 35b and converts the first excitation light LE1 and the second excitation light LE2 in term of wavelength and emits the fluorescence LY, and the light combiner 50, which combines the blue light LB outputted from the third light source 32 with the fluorescence LY emitted from the wavelength converter 35 to generate the illumination light LW. The first excitation light LE1 outputted from the first light source 30 is incident on the first surface 35a of the wavelength converter 35 via the light combiner 50, and the second excitation light LE2 outputted from the second light source 34 is incident on the second surface 35b of the wavelength converter 35.

According to the configuration described above, not only is the excitation light LE1 incident on the first surface 35a of the wavelength converter 35 but the excitation light LE2 is incident on the second surface 35b thereof, so that the two types of excitation light excite the phosphor, whereby the wavelength converter 35 can emit intense fluorescence LY. Adjusting the intensity of the blue light LB outputted from the third light source 32 so as to match the intensity of the intense fluorescence LY, the light source apparatus 2 according to the present embodiment can generate the illumination light LW having high brightness as well as excellent white balance.

In the light source apparatus 2 according to the present embodiment, the light exiting surface 34a of the second light source 34 and the second surface 35b of the wavelength converter 35 are in contact with each other. Instead, a light transmissive member is provided between the second light source 34 and the wavelength converter 35, and the light exiting surface 34a of the second light source 34 and the second surface 35b of the wavelength converter 35 are in contact with each other via the light transmissive member.

In both the configurations described above, there is no refractive index interface formed out of an air layer between the light exiting surface 34a of the second light source 34 and the second surface 35b of the wavelength converter 35. There is therefore no total reflection of the second excitation light LE2, which is outputted from the second light source 34, at a refractive index interface formed out of an air layer, whereby the second excitation light LE2 can be efficiently incident on the wavelength converter 35.

The light source apparatus 2 according to the present embodiment further includes the first collimator optical system 31, which is provided between the first light source 30 and the light combiner 50 and which the first excitation light LE1 outputted from the first light source 30 enters, and the second collimator optical system 36, which is provided between the wavelength converter 35 and the light combiner 50 and which the fluorescence LY emitted from the wavelength converter 35 and the first excitation light LE1 outputted from the first light source 30 and traveling via the combiner 50 enter.

According to described above, the first excitation light LE1 outputted from the first light source 30 is substantially parallelized by the first collimator optical system 31, is then focused by the second collimator optical system 36, and enters the wavelength converter 35. On the other hand, the fluorescence LY emitted from the wavelength converter 35 is substantially parallelized by the second collimator optical system 36. The luminance of the first excitation light LE1 and the fluorescence LY can thus be increased with the simple configuration.

In the light source apparatus 2 according to the present embodiment, the focal length of the first collimator optical system 31 is longer than the focal length of the second collimator optical system 36. Alternatively, the position of the first light source 30 on the first optical axis AX1 does not coincide with the position where the first collimator optical system 31 focuses light having the yellow wavelength band but is closer to the first collimator optical system 31.

According to the configurations described above, the region irradiated with the first excitation light LE1 on the wavelength converter 35 decreases, resulting in suppression of the loss of the first excitation light LE1, whereby the efficiency at which the first excitation light LE1 is used can be increased.

In the light source apparatus 2 according to the present embodiment, the area of the first light source 30 viewed in the direction along the first optical axis AX1 may be greater than the area of the wavelength converter 35 viewed in the direction along the second optical axis AX2.

According to the configuration described above, since the luminance of the fluorescence LY emitted from the wavelength converter 35 can be increased, adjusting the luminance of the light from the third light source 32 accordingly allows an increase in the luminance of the illumination light LW with the white balance thereof maintained.

In the light source apparatus 2 according to the present embodiment, the periphery of a lens that forms the second collimator optical system 36 may be provided with a selective reflection layer that selectively reflects the fluorescence LY.

According to the configuration described above, the selective reflection layer can reflect the fluorescence LY that is incident on the periphery of the lens and may therefore not be used in the subsequent optical system, so that the reflected fluorescence LY is allowed to return to the wavelength converter 35. The fluorescence LY having returned to the wavelength converter 35 is reflected again off the wavelength converter 35 and enters the second collimator optical system 36. Recycling the fluorescence LY that may not be used allows an increase in the efficiency at which the fluorescence LY is used.

In the light source apparatus 2 according to the present embodiment, the third wavelength band of the blue light LB outputted from the third light source 32 is formed out of wavelengths longer than those in the first wavelength band of the first excitation light LE1 outputted from the first light source 30 and those in the second wavelength band of the second excitation light LE2 outputted from the second light source 34.

According to the configuration described above, out of the light having the blue wavelength band, the blue light having a relatively long wavelength is used as the illumination light LW, and the blue light having a relatively short wavelength is used as the excitation light LE1 and LE2. For example, an LED device made of an InGaN-based material and designed for longer wavelengths have a higher In composition ratio and lower light emission efficiency, and the light emission efficiency can be increased by instead designing the LED device to be suitable for shorter wavelengths. Therefore, according to the configuration described above, the projector 1 can achieve high efficiency as well as excellent color reproduction in images projected by the projector 1. Furthermore, since the blue light LB, which has a relatively short wavelength, does not enter the polarizing film or the liquid crystal panels of the projector 1, the life of these optical members can be secured.

In the light source apparatus 2 according to the present embodiment, the first light source 30 and the second light source 34 each include an LED device, and the third light source 32 includes an LED device or a laser device.

According to the configuration described above, even when the first light source 30 and the second light source 34 each include an LED device that outputs light having power lower than the power of the light from a laser device, the phosphor is excited by both the light via the first surface 35a of the wavelength converter 35 and the light via the second surface 35b thereof, whereby intense fluorescence LY can be generated.

The projector 1 according to the present embodiment includes the light source apparatus 2, the light modulators 4B, 4G, and 4R, which modulate the light outputted from the light source apparatus 2 in accordance with image information, and the projection optical apparatus 6, which projects the light modulated by the light modulators 4B, 4G, and 4R.

The configuration described above allows the projector 1 to provide excellent display quality and produce a bright image.

Second Embodiment

A second embodiment of the present disclosure will be described below with reference to FIG. 5.

The light source apparatus according to the second embodiment has the same configuration as the light source apparatus according to the first embodiment, but the configuration of the projector differs from that in the first embodiment.

Figure 5:
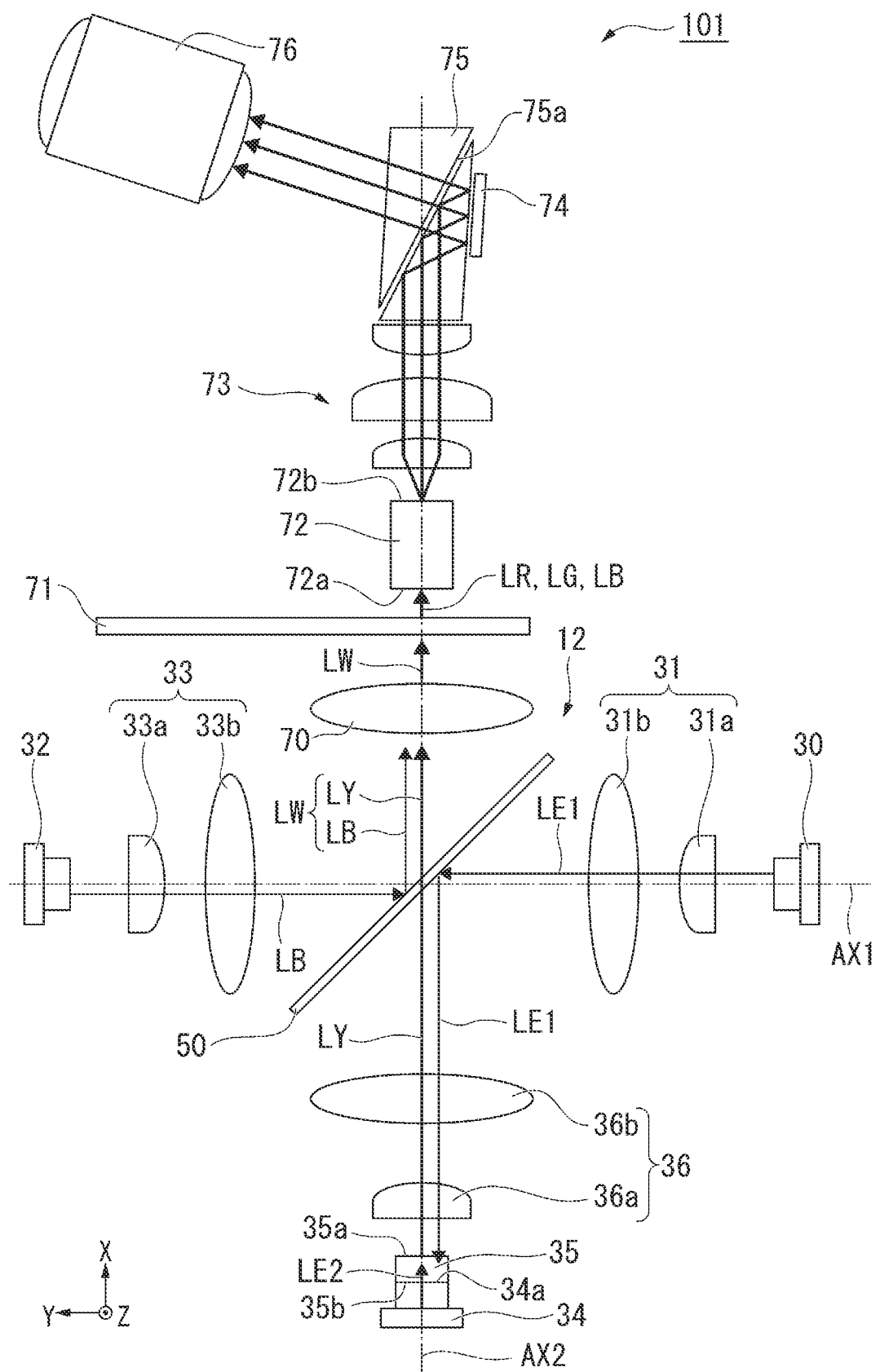
FIG. 5 is a schematic configuration diagram of a projector according to a second embodiment.

FIG. 5 is a schematic configuration diagram of a projector 101 according to the second embodiment.

In FIG. 5, components common to those in the figures used in the first embodiment have the same reference characters and will not be described.

The projector 101 according to the present embodiment includes a light source apparatus 12, which is the same as the light source apparatus 2 according to the first embodiment, a condenser lens 70, a color wheel 71, a rod lens 72, a relay system 73, a micromirror-type light modulator 74, a total reflection prism 75, and a projection optical apparatus 76, as shown in FIG. 5.

The light source apparatus 12 outputs the white illumination light LW toward the condenser lens 70. The condenser lens 70 causes the illumination light LW to be incident on the color wheel 71. The color wheel 71 includes color filters corresponding to the red light LR, the green light LG, and the blue light LB and generates the red light LR, the green light LG, and the blue light LB out of the white illumination light LW in a time sequential manner, and the generated red light LR, green light LG, and blue light LB exit out of the color wheel 71. The red light LR, the green light LG, and the blue light LB having exited out of the color wheel 71 in a time sequential manner enter the rod lens 72.

The rod lens 72 has a light incident surface 72a and a light exiting surface 72b. The rod lens 72 causes the light incident via the light incident surface 72a to be totally reflected off the side surface of the rod lens 72 and then exit via the light exiting surface 72b. The rod lens 72 thus homogenizes the optical intensity distribution of the light.

The relay system 73 cooperates with the rod lens 72 to cause the red light LR, the green light LG, and the blue light LB having the homogenized intensity distribution to exit toward the total reflection prism 75. The total reflection prism 75 is made of a light transmissive material and has a reflection surface 75a. The angle of the reflection surface 75a is so set that the red light LR, the green light LG, and the blue light LB incident thereon in a time sequential manner are totally reflected toward the micromirror-type light modulator 74.

The micromirror-type light modulator 74 is formed, for example, out of a DMD (digital micromirror device). The DMD has a configuration in which a plurality of micromirrors are arranged in a matrix. The DMD switches the direction in which the plurality of micromirrors tilt to switch the direction in which the light incident thereon is reflected between the direction in which the incident light passes through the reflection surface 75a and the direction in which the incident light is reflected off the reflection surface 75a.

The micromirror-type light modulator 74, which is formed out of a DMD, thus sequentially modulates the red light LR, the green light LG, and the blue light LB generated in a time sequential manner by the color wheel 71 to generate green image light, red image light, and blue image light. The projection optical apparatus 76 projects the green image light, the red image light, and the blue image light onto a screen (not shown).

As described above, the projector 101 according to the present embodiment, which includes the light source apparatus 12 capable of generating bright white light and uses the micromirror-type light modulator 74, can project a bright image that excels in display quality.

The technical scope of the present disclosure is not limited to the embodiments described above, and a variety of changes can be made thereto to the extent that the changes do not depart from the substance of the present disclosure.

For example, although not described in the aforementioned embodiments, optical members, such as an optical diffuser and a homogenizer optical system including a pair of microlens arrays, may be provided, for example, in the optical path of each of the first excitation light, the second excitation light, and the blue light as a component that homogenizes the intensity distribution in the light irradiated region.

The aforementioned embodiments have been described with reference to the case where the projector according to an aspect of the present disclosure is used as a projector including three light modulators, but the projector does not necessarily include a plurality of light modulators and may include only one light modulator.

In addition to the above, the number, arrangement, shape, material, and other specific factors of the variety of components that form the light source apparatus and the projector are not limited to those in the embodiments described above and can be changed as appropriate.

The aforementioned embodiments have been described with reference to the case where the light source apparatus according to an aspect of the present disclosure is incorporated in a projector, but not necessarily. The light source apparatus according to the aspect of the present disclosure may also be used as a lighting apparatus, a headlight of an automobile, and other components.

The light source apparatus according to the aspect of the present disclosure may have the configuration below.

The light source apparatus according to the aspect of the present disclosure includes a first light source that outputs first excitation light having a first wavelength band, a second light source that outputs second excitation light having a second wavelength band, a third light source that outputs third light having a third wavelength band, a wavelength converter that has a first surface and a second surface opposite from the first surface and converts the first excitation light and the second excitation light in term of wavelength and emits fourth light having a fourth wavelength band different from the first, second, and third wavelength bands, and a light combiner that combines the third light outputted from the third light source with the fourth light emitted from the wavelength converter to generate illumination light. The first excitation light outputted from the first light source is incident on the first surface of the wavelength converter via the light combiner, and the second excitation light outputted from the second light source is incident on the second surface of the wavelength converter.

In the light source apparatus according to the aspect of the present disclosure, the light exiting surface of the second light source and the second surface of the wavelength converter may be in contact with each other.

The light source apparatus according to the aspect of the present disclosure may further include a light transmissive member between the second light source and the wavelength converter, and the light exiting surface of the second light source and the second surface of the wavelength converter may be in contact with each other via the light transmissive member.

The light source apparatus according to the aspect of the present disclosure may further include a first collimator optical system which is provided between the first light source and the light combiner and which the first excitation light outputted from the first light source enters and a second collimator optical system which is provided between the wavelength converter and the light combiner and which the fourth light emitted from the wavelength converter and the first excitation light outputted from the first light source and traveling via the combiner enter.

In the light source apparatus according to the aspect of the present disclosure, the focal length of the first collimator optical system may be longer than the focal length of the second collimator optical system.

In the light source apparatus according to the aspect of the present disclosure, the position of the first light source on a first optical axis that is an axis along the chief ray of the first excitation light outputted from the first light source may not coincide with the position where the first collimator optical system focuses light having the third wavelength band but may be closer to the first collimator optical system.

In the light source apparatus according to the aspect of the present disclosure, the area of the first light source viewed in the direction along the first optical axis may be greater than the area of the wavelength converter viewed in the direction along a second optical axis that is an axis along the chief ray of the fourth light emitted from the wavelength converter.

In the light source apparatus according to the aspect of the present disclosure, the periphery of a lens that forms the second collimator optical system may be provided with a selective reflection layer that selectively reflects the fourth light.

In the light source apparatus according to the aspect of the present disclosure, the third wavelength band may be formed of wavelengths longer than those in the first wavelength band and those in the second wavelength band.

In the light source apparatus according to the aspect of the present disclosure, the first light source and the second light source may each include a light emitting diode device, and the third light source may include a light emitting diode device or a laser device.

The projector according to the aspect of the present disclosure may have the configuration below.

The projector according to the aspect of the present disclosure includes the light source apparatus according to the aspect of the present disclosure, a light modulator that modulates light outputted from the light source apparatus in accordance with image information, and a projection optical apparatus that projects the light modulated by the light modulator.

What is claimed is:

1. A light source apparatus comprising:
    a first light source that outputs first excitation light having a first wavelength band;
    a second light source that outputs second excitation light having a second wavelength band;
    a third light source that outputs third light having a third wavelength band;
    a wavelength converter that has a first surface and a second surface opposite from the first surface and converts the first excitation light and the second excitation light in term of wavelength and emits fourth light having a fourth wavelength band different from the first, second, and third wavelength bands;
    a light combiner mirror that combines the third light outputted from the third light source with the fourth light emitted from the wavelength converter to generate illumination light;
    a first collimator optical system which is provided between the first light source and the light combiner mirror and which the first excitation light outputted from the first light source enters; and
    a second collimator optical system which is provided between the wavelength converter and the light combiner mirror and which the fourth light emitted from the wavelength converter and the first excitation light outputted from the first light source and traveling via the combiner enter,
    wherein the first excitation light outputted from the first light source is incident on the first surface of the wavelength converter via the light combiner mirror, and
    the second excitation light outputted from the second light source is incident on the second surface of the wavelength converter, and
    a focal length of the first collimator optical system is longer than a focal length of the second collimator optical system.

2. The light source apparatus according to claim 1, wherein a light exiting surface of the second light source and the second surface of the wavelength converter are in contact with each other.

3. The light source apparatus according to claim 1, further comprising a light transmissive member between the second light source and the wavelength converter, wherein a light exiting surface of the second light source and the second surface of the wavelength converter are in contact with each other via the light transmissive member.

4. The light source apparatus according to claim 1, wherein a position of the first light source on a first optical axis that is an axis along a chief ray of the first excitation light outputted from the first light source does not coincide with a position where the first collimator optical system focuses light having the third wavelength band but is closer to the first collimator optical system.

5. The light source apparatus according to claim 1, wherein an area of the first light source viewed in a direction along the first optical axis is greater than an area of the wavelength converter viewed in a direction along a second optical axis that is an axis along a chief ray of the fourth light emitted from the wavelength converter.

6. The light source apparatus according to claim 1, wherein a periphery of a lens that forms the second collimator optical system is provided with a selective reflection layer that selectively reflects the fourth light.

7. The light source apparatus according to claim 1, wherein the third wavelength band is formed of wavelengths longer than wavelengths in the first wavelength band and wavelengths in the second wavelength band.

8. The light source apparatus according to claim 1,
    wherein the first light source and the second light source each include a light emitting diode device, and the third light source includes a light emitting diode device or a laser device.

9. A projector comprising:
    the light source apparatus according to claim 1;
    a light modulator that modulates light outputted from the light source apparatus in accordance with image information; and
    a projection optical apparatus that projects the light modulated by the light modulator.

10. A light source apparatus comprising:
    a first light source that outputs first excitation light having a first wavelength band;
    a second light source that outputs second excitation light having a second wavelength band;
    a third light source that outputs third light having a third wavelength band;
    a wavelength converter that has a first surface and a second surface opposite from the first surface and converts the first excitation light and the second excitation light in term of wavelength and emits fourth light having a fourth wavelength band different from the first, second, and third wavelength bands;

a light combiner mirror that combines the third light outputted from the third light source with the fourth light emitted from the wavelength converter to generate illumination light;

a first collimator optical system which is provided between the first light source and the light combiner mirror and which the first excitation light outputted from the first light source enters; and a second collimator optical system which is provided between the wavelength converter and the light combiner mirror and which the fourth light emitted from the wavelength converter and the first excitation light outputted from the first light source and traveling via the combiner enter, wherein the first excitation light outputted from the first light source is incident on the first surface of the wavelength converter via the light combiner mirror, the second excitation light outputted from the second light source is incident on the second surface of the wavelength converter, and a periphery of a lens that forms the second collimator optical system is provided with a selective reflection layer that selectively reflects the fourth light.

11. The light source apparatus according to claim 10, wherein an area of the first light source viewed in a direction along the first optical axis is greater than an area of the wavelength converter viewed in a direction along a second optical axis that is an axis along a chief ray of the fourth light emitted from the wavelength converter.

12. The light source apparatus according to claim 10, wherein the third wavelength band is formed of wavelengths longer than wavelengths in the first wavelength band and wavelengths in the second wavelength band.

13. The light source apparatus according to claim 10,
wherein the first light source and the second light source each include a light emitting diode device, and
the third light source includes a light emitting diode device or a laser device.

14. A projector comprising:
the light source apparatus according to claim 10;
a light modulator that modulates light outputted from the light source apparatus in accordance with image information; and
a projection optical apparatus that projects the light modulated by the light modulator.

15. A light source apparatus comprising:
a first light source that outputs first excitation light having a first wavelength band;
a second light source that outputs second excitation light having a second wavelength band;
a third light source that outputs third light having a third wavelength band;

a wavelength converter that has a first surface and a second surface opposite from the first surface and converts the first excitation light and the second excitation light in term of wavelength and emits fourth light having a fourth wavelength band different from the first, second, and third wavelength bands;

a light combiner mirror that combines the third light outputted from the third light source with the fourth light emitted from the wavelength converter to generate illumination light;

a first collimator optical system which is provided between the first light source and the light combiner mirror and which the first excitation light outputted from the first light source enters; and a second collimator optical system which is provided between the wavelength converter and the light combiner mirror and which the fourth light emitted from the wavelength converter and the first excitation light outputted from the first light source and traveling via the combiner enter, wherein the first excitation light outputted from the first light source is incident on the first surface of the wavelength converter via the light combiner mirror, the second excitation light outputted from the second light source is incident on the second surface of the wavelength converter, and a position of the first light source on a first optical axis that is an axis along a chief ray of the first excitation light outputted from the first light source does not coincide with a position where the first collimator optical system focuses light having the third wavelength band but is closer to the first collimator optical system.

16. The light source apparatus according to claim 15, wherein an area of the first light source viewed in a direction along the first optical axis is greater than an area of the wavelength converter viewed in a direction along a second optical axis that is an axis along a chief ray of the fourth light emitted from the wavelength converter.

17. The light source apparatus according to claim 15, wherein the third wavelength band is formed of wavelengths longer than wavelengths in the first wavelength band and wavelengths in the second wavelength band.

18. The light source apparatus according to claim 15,
wherein the first light source and the second light source each include a light emitting diode device, and
the third light source includes a light emitting diode device or a laser device.

19. A projector comprising:
the light source apparatus according to claim 15;
a light modulator that modulates light outputted from the light source apparatus in accordance with image information; and
a projection optical apparatus that projects the light modulated by the light modulator.

* * * * *